United States Patent
Prokopenko et al.

(10) Patent No.: US 7,158,143 B2
(45) Date of Patent: Jan. 2, 2007

(54) FAST ALGORITHM FOR ANISOTROPIC TEXTURE SAMPLING

(75) Inventors: Boris Prokopenko, Milpitas, CA (US); Timour Paltashev, Fremont, CA (US)

(73) Assignee: VIA Technologies, Inc. (TW)

( * ) Notice: Subject to any disclaimer, the term of this patent is extended or adjusted under 35 U.S.C. 154(b) by 200 days.

(21) Appl. No.: 11/004,636

(22) Filed: Dec. 3, 2004

(65) Prior Publication Data

US 2006/0119608 A1 Jun. 8, 2006

(51) Int. Cl.
- G09G 5/00 (2006.01)
- G06T 17/00 (2006.01)
- G06K 9/40 (2006.01)
- G06K 9/32 (2006.01)

(52) U.S. Cl. ............. 345/586; 345/582; 345/606; 345/610; 345/639; 382/300

(58) Field of Classification Search ........ 345/418–428, 345/581–589, 606–610, 643, 639; 382/254, 382/260, 265, 300
See application file for complete search history.

(56) References Cited

U.S. PATENT DOCUMENTS

| | | | |
|---|---|---|---|
| 5,651,104 A | | 7/1997 | Cosman et al |
| 6,005,582 A | * | 12/1999 | Gabriel et al. ............... 345/586 |
| 6,097,397 A | | 8/2000 | Lee |
| 6,236,405 B1 | | 5/2001 | Schilling et al. |
| 6,239,808 B1 | * | 5/2001 | Kirk et al. .................. 345/582 |
| 6,292,193 B1 | * | 9/2001 | Perry et al. ................. 345/582 |

OTHER PUBLICATIONS

P.S. Heckbert, "Survey of Testure Mapping," pp. 1-14, PIXAR Abstract, published in Graphics Interface May 1986, pp. 207-212.
Shin et al., "SPAF: Sub-texel Precision Anisotropic Filtering," Aug. 13, 2001. pp. 1-13, presented by the Dept. of EE & CS of the Korea Advanced Institute of Science and Technology, Taejon, Korea.
Olano et al., "Vertex-based Anisotropic Texturing," SGI internal publication.
Schilling et al., "Texram: A Smart Memory for Texturing," May 1996, pp. 32-41, IEEE Computer Graphics and Applications.
Wu, Kevin, "Rational-Linear Interpolation of Texture Coordinates and Their Partial Derivatives," Jun. 1998, pp. 0-13, Copyright Hewlett-Packard Company 1998.
Wu, Kevin, "Direct Calculation of MIP—Map Level for Faster Texture Mapping," Jun. 1998, pp. 0-6, Copyright Hewlett-Packard Company 1998.
unknown author, pp. 129-141, from an unknown book that covers image texturing in Chapter 5.2-5.3.

* cited by examiner

Primary Examiner—Wesner Sajous
(74) Attorney, Agent, or Firm—Anthony B. Diepenbrock, III; Dechert LLP

(57) ABSTRACT

A faster algorithm for computing the texture of a pixel is disclosed. A major and minor direction in texel space are determined. Steps in the major direction are set to unity and steps in the minor direction are set to the slope of the anistropy line of the footprint. The end points of the anistropy line in the major direction are then positioned to be on grid in the texture space. The texture is computed for each sample along the anistropy line by computing an interpolation cooefficient for the sample, linearly interpolating two texels based on the cooefficient, weighting the interpolated sample, and accumulating the weighted samples. The result is the texture value to be used for the pixel.

15 Claims, 11 Drawing Sheets

FAST ALGORITHM FOR ANISOTROPIC TEXTURE SAMPLING

FIELD OF THE INVENTION

This invention relates generally to texture mapping in a computer graphics application and more particularly to a system and method for computing texels in texture space.

DESCRIPTION OF THE RELATED ART

FIG. 1A shows a typical computer system with a graphics display processor and a frame buffer. In particular, a system bus 10 is used to connect the CPU 12, the display or graphics processor 14, the system memory 16 and any I/O subsystems needed 18. The display processor is also connected to the display processor memory 20 and the frame buffer 22. A video controller 24 is used to display the contents of the frame buffer 22 on the monitor 26. The display processor typically receives instructions from display processor memory and executes them to build an image in the frame buffer. Texture information may be stored in the system memory 16 or the display processor memory 20.

Texture mapping is the mapping of a function onto a surface in three-dimensional object space. The domain of the texture function can be a one, two, or three-dimensional array. Most commonly it is a two-dimensional space with coordinates (u, v). In particular, $I:T \rightarrow S_{3D}$, where I is the function that applies a 2D texture in texture space T to a surface S in 3D space, as shown in FIG. 1B. After the texture is applied to the surface, a transformation, usually a perspective transformation, is used to map the surface to the 2D screen space, i.e., $P:S_{3D}{}^T \rightarrow D_{2D}$, where P is the transformation that applies the view frustum to the 3D space with coordinates $(x_0, y_0, z_0)$ to find the visible portion in 2D screen space with coordinates (x, y), as shown in FIG. 1B. Usually, this mapping is viewed as a composite mapping I∘P, i.e., one from the texture space to the screen space. If this composite mapping is invertible, i.e., $(I \circ P)^{-1}$ is possible, the composite mapping lends itself to screen order scanning where, for each pixel in screen space, the footprint area of the pixel in texture space is found and this area is filtered to obtain the applicable texturing. The footprint area of a pixel may be described approximately by a (possibly curvilinear) quadrilateral having a length and a width with the center of a pixel in the center of the quadrilateral. Some form of filtering is used to find the texture value of the pixel based on the shape of the quadrilateral. Often the shape of the footprint is simplified to be a planar quadrilateral or a parallelogram.

Often a texture map has too much detail for the pixel to be displayed. This occurs if the pixel is part of a small object that is distant from the viewing point. To reduce the detail of the texture map, a process called mipmapping is used. Instead of having one extremely detailed texture map, a pyramid of prefiltered texture maps is formed. Texture maps at the bottom of the pyramid are more detailed and texture maps at the top of the pyramid are bilinear filtered texture maps from bottom levels. The position in the pyramid is called the level of detail (LOD), which can indicate one of the levels in the pyramid or a pair of levels to be used if interpolation of the pair of levels is permitted. Proper use of mipmapping can help avoid aliasing and blurring of the image.

Traditional anisotropic filtering uses a simplified and approximate model of the pixel's projection (footprint) to the texture space to achieve good performance with visually acceptable results.

It uses six parameters:

r—ratio, the length of the pixel's footprint in the texture space at the given LOD level;

LOD—current MIP level and d-fraction for blending between MIP-levels;

du—the slope of the major axis of the footprint along the u-axis;

dv—the slope of the major axis of the footprint along the v-axis;

$u_0$—the u-coordinate of the position of the center of the pixel's footprint;

$v_0$—the v-coordinate of the position of the center of the pixel's footprint;

Now referring to FIG. 2A, along the line specified by $u_0$, $v_0$, du and dv, anisotropic filtering takes ceil(r) bi-linear samples 100, 102, 104, 106, 108, 110, 112, distributed evenly with center in $(u_0, v_0)$ 114. If the r>1, anisotropic filtering becomes extensive and takes a lot of computational power.

At the first stage of filtering, the anisotropic filtering fetches bi-linear samples along the center line. The distance between each two samples is 1, which means that the texels, used for the samples, are frequently used twice. Also, using a lot of bi-linear samples takes extensive computation. There is a need for a system of computing texels which is less computationally intensive, yet still preserves the quality of the textured image.

BRIEF SUMMARY OF THE INVENTION

The present invention is directed towards such a need. The present invention avoids sampling texels more than once and has better performance with little loss in quality compared to the traditional technique.

A method in accordance with the present invention is a method of rendering a pixel with texture values. The method includes establishing sample points of a footprint of a pixel in a planar texture space, where the texture space has a grid derived from discrete points on a first axis and a second axis orthogonal to the first axis and the first axis is the axis along which a change in texture is greater than that along the second axis, linearly interpolating two texel values at each sample point on the first axis, where the texel values are derived from a pair of adjacent grid points on the second axis, by weighting a sum of the two texel values based on the position of the sample point between the adjacent grid points of the second axis, and assigning a weight to each of the interpolated texel values and accumulating the weighted texel values to arrive at a final texture value for the pixel. The pixel is then rendered with the final texture value.

Another method in accordance with the present invention includes mapping a pixel to be displayed to a texture space to form a footprint of the pixel in said space, where the footprint defines an anisotropy line having a pair of actual end points, determining a major direction and a minor direction of the footprint in said space, where the major and minor direction being axes in said texture space, setting a step size in the major direction to unity and a step size in the minor direction to the slope of the anisotropy line, positioning the actual end points of the anisotropy line to be on grid in said texture space, where the step size defines a number of samples including the positioned end points along the anisotropy line, and where each sample is to be assigned a weight, and computing a normalized weight for each of the positioned end points. The method further includes, for each of the samples including the positioned end points on the anisotropy line in texture space, the steps of computing an interpolation coefficient, obtaining first and second texel values to be interpolated, linearly interpolating the first and second texel values to create an interpolated texel value, computing a normalized weight of the sample if the sample is not one of the positioned end points, and accumulating weighted interpolated texels. The pixel with the accumulated texture value is then rendered with that texture value.

One advantage of the present invention is that there are fewer samples for which an interpolated texture is computed. This results from the use of unit steps when the major axis of the pixel's footprint is projected onto the u or v axis.

Another advantage is that the present invention uses fewer computational resources to find the final value of a texture for a given pixel because of the use of linear interpolation. Also saves memory bandwidth (less number of samples to be fetched)

Yet another advantage of the present invention is that the image quality is good because the present invention avoids aliasing by using a sufficient number of sample points.

Yet another advantage of the present invention is that it operates at a given level of detail to avoid computing textures that are not needed for the current view of a user.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1A:
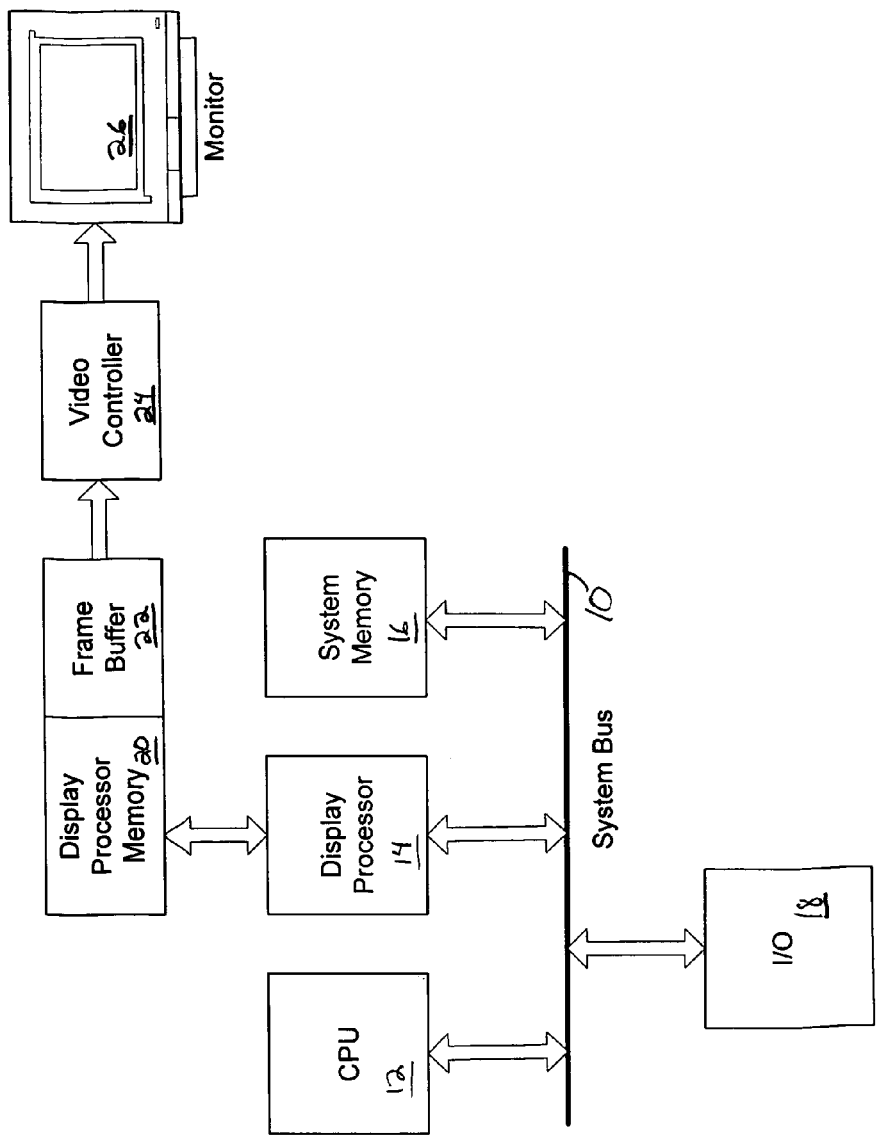
FIG. 1A shows a typical computer system with a graphics display processor and a frame buffer.
Figure 1B:
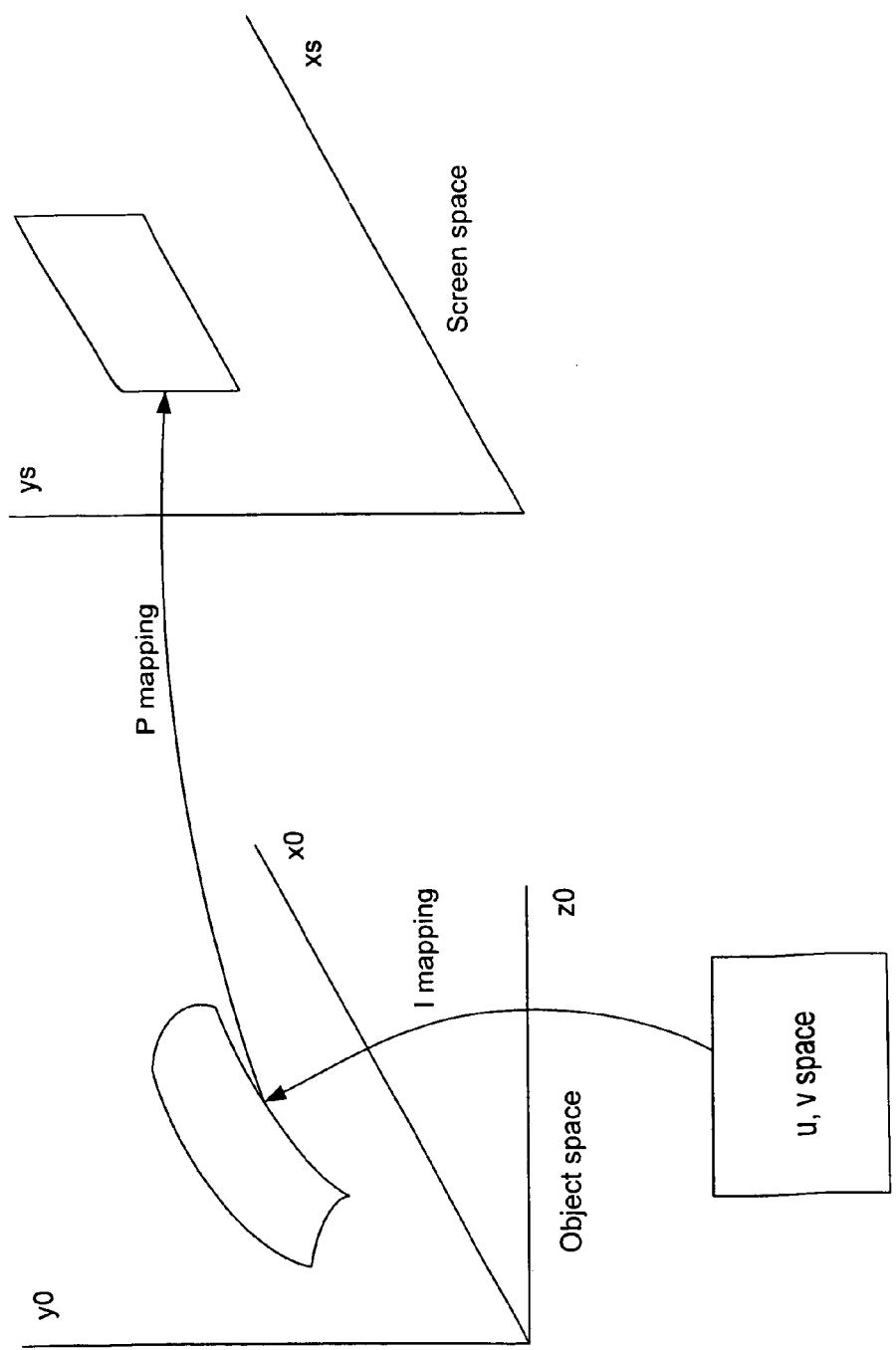
FIG. 1B shows the general mapping involved in applying textures to an image.
Figure 2A:
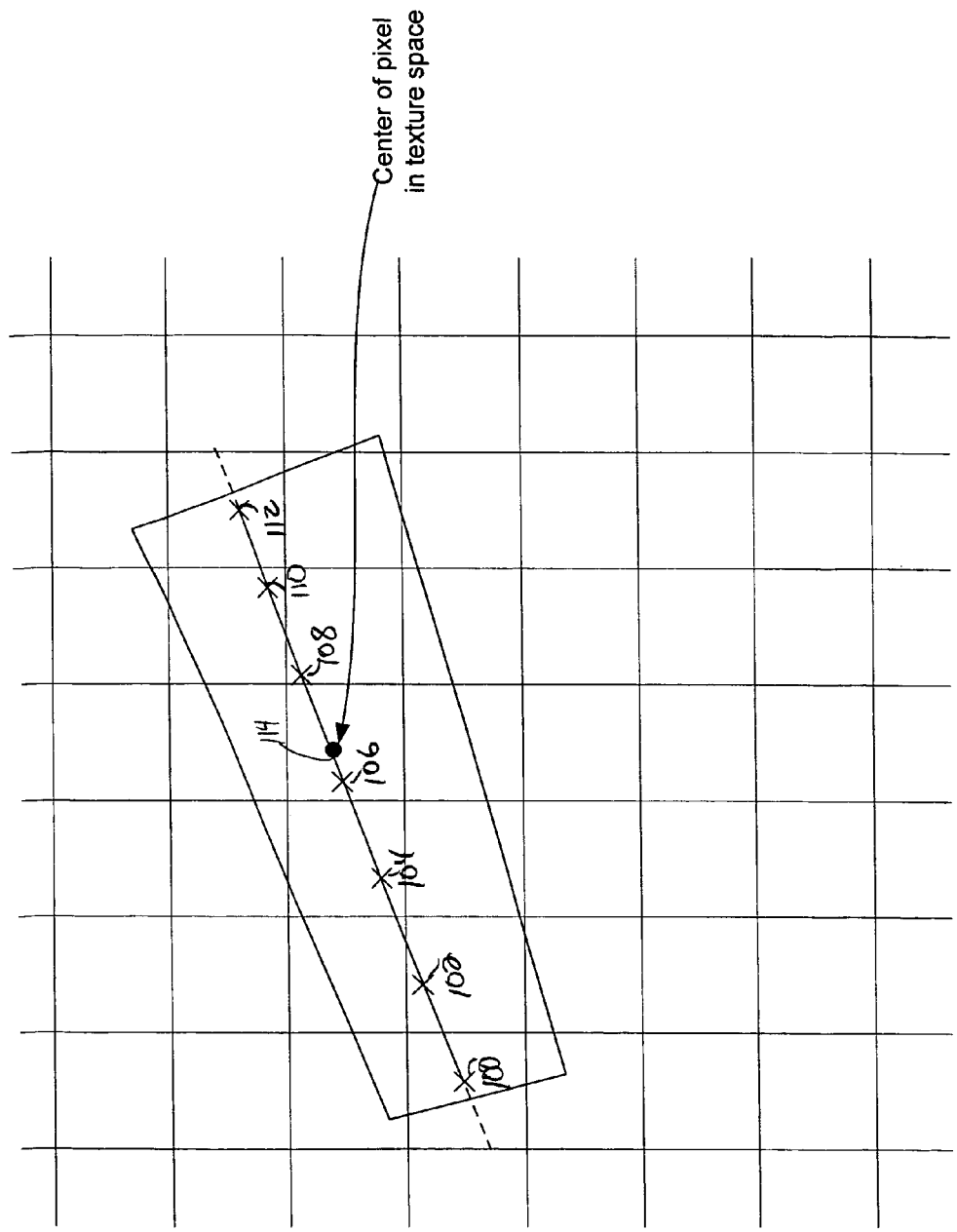
FIG. 2A shows a footprint of a pixel in the texture space with the conventional sample points marked on the sample line.
Figure 2B:
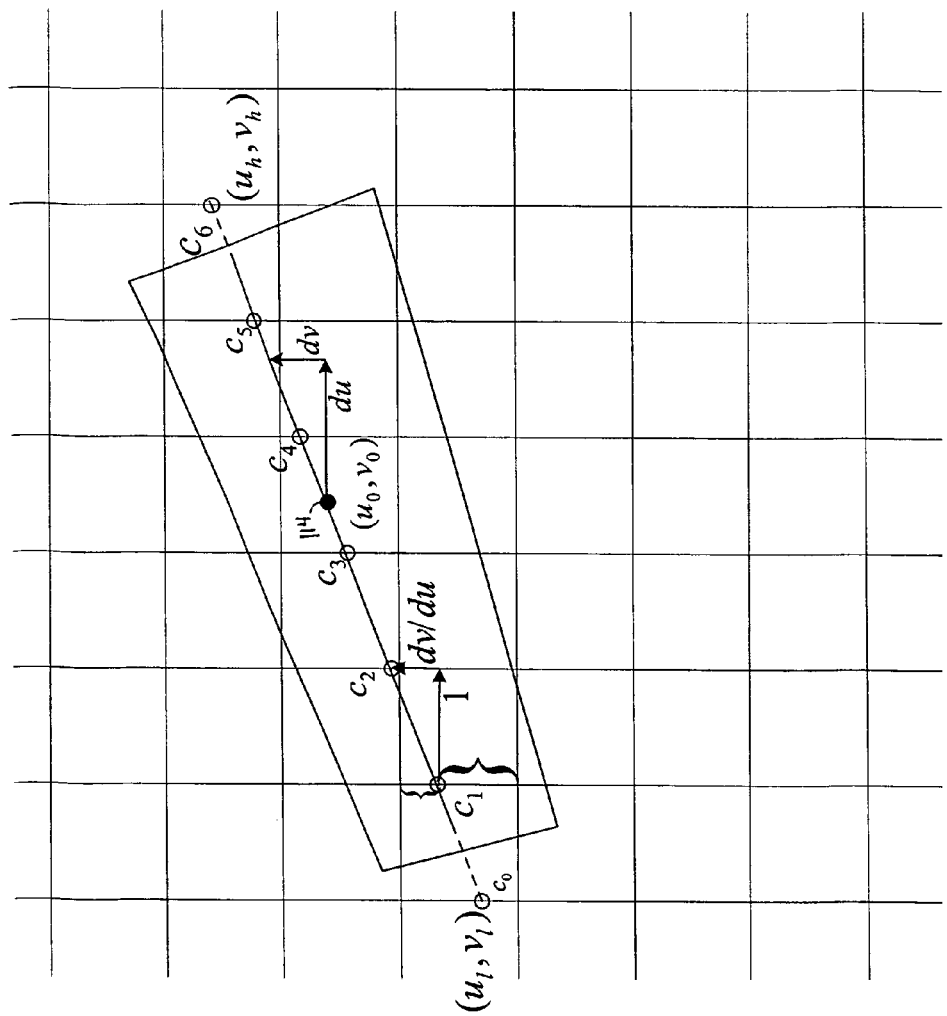
FIG. 2B shows the coordinates and sample points of the present invention.

FIG. 2B illustrates the way the samples for anisotropic filtering are taken for an algorithm in accordance with an embodiment of the present invention. Here is the sequence of actions to be taken in the implementation of the latter:

Having du and dv, the major direction corresponds to the direction with the larger gradient. The step in the major direction is 1, as the algorithm takes linear, not bi-linear, samples; therefore, one of the coordinates should always be an integer and the step in the minor direction should be corrected correspondingly. For what follows, it is assumed that du>dv, as illustrated in FIG. 2B. The opposite case is discussed below.

$$d_u = 1, d_v = \frac{dv}{du} \quad (1)$$

The anisotropy line should be projected to the axis of the major direction, and the enpoints, extended to the integer grid, must be found. This is done by the following computations.

$$u_l = \text{floor}(u_0 - r|du|) \quad v_l = v_0 + (u_l - u_0)\frac{dv}{du} \quad (2)$$

$$u_h = \text{ceiling}(u_0 + r|du|) \quad v_h = v_0 + (u_h - u_0)\frac{dv}{du} \quad (3)$$

Equation (2) determines the integer closest to the lower end point for the u-coordinaate and the v-coordinate from dv and the u-coordinate. Use of the floor function has the effect of possibly extending the lower end point. Equation (3) determines the integer closest to the upper end point for the u-coordinate and the v-coordinate from dv and the u-coordinate. Use of the ceiling function has the effect of possibly extending the upper end point. (The function floor(x) is defined as the largest integer less than or equal to x and the function ceiling(x) is the smallest integer no less than x.)

All the samples other than the end points have equal weight, 1/W. The end points have weights according to their distance from the ends of the original center line.

$$w_l = 1-q \quad (4)$$

$$w_h = 1+q \quad (5)$$

Equation (4) gives the weight for the lower end point, where $q=(u_0-r|du|)-u_l$, i.e., the difference between the actual u-coordinate of the lower end point and the extended u-coordinate. If q is large, then $w_l$ is smaller, giving less weight to an actual end point that is far from the extended end point and giving more weight to $w_h$, the weight of the upper end point.

$$k = u_h - u_l \quad (6)$$

The parameter k in Equation (6) gives the number of unit steps between the highest u-coordinate and lowest u-coordinate of the footprint.

Equation (7) gives the normalized weight of each of the samples, each having an equal weight, where W=1+k is the normalizing parameter used to assure that the weights add up to unity.

$$w_i = \frac{1}{W} \quad (7)$$

$$w_0 = \frac{w_l}{W}, w_k = \frac{w_h}{W} \quad (8)$$

Equation (8) gives the normalized weights for the end points.

In Equation (9), the sample coordinates are calculated iteratively starting from one of the end points as follows.

$$c_i = c_{i-1} + \left(1, \frac{dv}{du}\right), i = 1 \ldots k, \text{ where} \quad (9)$$

$$c_0 = (u_l, v_l),$$

$$c_{i,0} = u_i$$

$$c_{i,1} = v_i.$$

The linearly interpolated textures for each of the sample coordinates are next computed. For each of the sample coordinates, i.e., for i=0...k, the following calculations are performed.

$$\tilde{c}_i = \text{floor}(c_{i,1}) \quad (10)$$

$$\alpha_i = c_{i,1} - \tilde{c}_i \quad (11)$$

$$s_{i,0} = t(c_{i,0}, \tilde{c}_i) \quad (12)$$

$$s_{i,1} = t(c_{i,0}, \tilde{c}_i + 1) \quad (13)$$

$$S_i = (1-\alpha)s_{i,0} + \alpha s_{i,1} \quad (14)$$

In Equation (10), the floor of the v-coordinate of the sample is found. Next, in Equation (11), the difference between the floor and the v-coordinate is calculated to give the interpolation parameter, $\alpha$. In Equation (12), the texture for the u-coordinate and the floor of the v-coordinate is found. In Equation (13), the texture for the u-coordinate and the floor +1 of the v-coordinate is found. In Equation (14), the linear interpolation occurs using the interpolation parameter, $\alpha$. Thus, for each sample point along the sample line an interpolated texture value $S_i$ is obtained. The final texture value to be used for the pixel is computed as the weighted sum of the linearly interpolated texture values $S_i$, one for each sample:

$$a = \sum_{i=0}^{k} S_i w_i = S_0 w_0 + \sum_{i=1}^{k-1} S_i w_i + S_k w_k \quad (15)$$

Below are the equations for the opposite case, i.e., when $dv \geq du$.

$$d_u = \frac{du}{dv}, d_v = 1 \quad (16)$$

Equation (16) sets the step of the major axis, now v, to unity.

$$u_l = u_0 + (v_l - v_0)\frac{du}{dv}, v_l = \text{floor}(v_0 - r|du|) \quad (17)$$

Equation (17) computes the lower end point coordinates, possibly extending the v-coordinate.

$$u_h = u_0 + (v_h - v_0)\frac{du}{dv}, v_h = \text{ceiling}(v_0 + r|du|) \quad (18)$$

Equation (18) computes the upper end points, possibly extending the v-coordinate.

$$w_l = 1-p, \text{ where } p = (v_0 - r|du|) - v_l \quad (19)$$

$$w_h = 1+p \quad (20)$$

Equation (19) computes the weight of the lower end point coordinates and equation (20) computes the weight of the upper end point coordinates. Each of these end points is a sample.

$$k = v_h - v_l \quad (21)$$

Equation (21) computes the number of steps based on the major coordinate.

$$W = 1 + k; \quad (22)$$

$$w_0 = \frac{w_l}{W}, w_k = \frac{w_h}{W} \quad (23)$$

Equations (22) compute the normalizing weight and equation (23) computes the normalized weight of the end point samples.

$$c_i = c_{i-1} + \left(\frac{du}{dv}, 1\right), i = 1 \ldots k \quad (24)$$

Equation 24 computes the next sample based on the previous sample. The major axis coordinate, v in this case, is obtained by a unit step, and the minor axis coordinate is obtained by adding the slope to the previous sample minor axis coordinate.

$$c_0 = (u_l, v_l) \quad (25)$$

$$c_{i,0} = u_i, c_{i,1} = v_i \quad (26)$$

Equation (25) gives the starting sample, which is one of the end points.

$$\tilde{c}_i = \text{floor}(c_{i,0}) \quad (27)$$

Equation (27) computes the minor axis coordinate of the current sample at the largest grid intersection less than the actual minor axis coordinate.

$$\alpha_i = c_{i,0} - \tilde{c}_i \quad (28)$$

Equation (28) computes the difference between the floor of the minor axis coordinate and the actual coordinate as the interpolation cooeficient. This gives an indication of how close the actual coordinate is to the nearest grid intersection. The smaller the difference the smaller the interpolation coefficient.

$$s_{i,0} = t(c_{i,1}, \tilde{c}_i) \quad (29)$$

$$s_{i,1} = t(c_{i,1}, \tilde{c}_i + 1) \quad (30)$$

Equations (29) and (30) fetch the texels for the minor axis coordinates at the floor and the floor +1 positions for the major axis position of the sample.

$$S_i = (1-\alpha)s_{i,0} + \alpha s_{i,1} \quad (31)$$

Equation (31) linearly interpolates the fetched texels. A texel for a sample closer to a minor axis grid coordinate is weighted more heavily.

$$w_i = \frac{1}{W} \quad (32)$$

Equation (32) computes the weight of a sample that is not one of the end points (whose weights were already calculated).

$$a = \sum_{i=0}^{k} S_i w_i = S_0 w_0 + \sum_{i=1}^{k-1} S_i w_i + S_k w_k \qquad (33)$$

Equation (33) accumulates the sample-weight products. After all of the samples have been textured, a provides a final texture for the pixel.

Figure 3A:
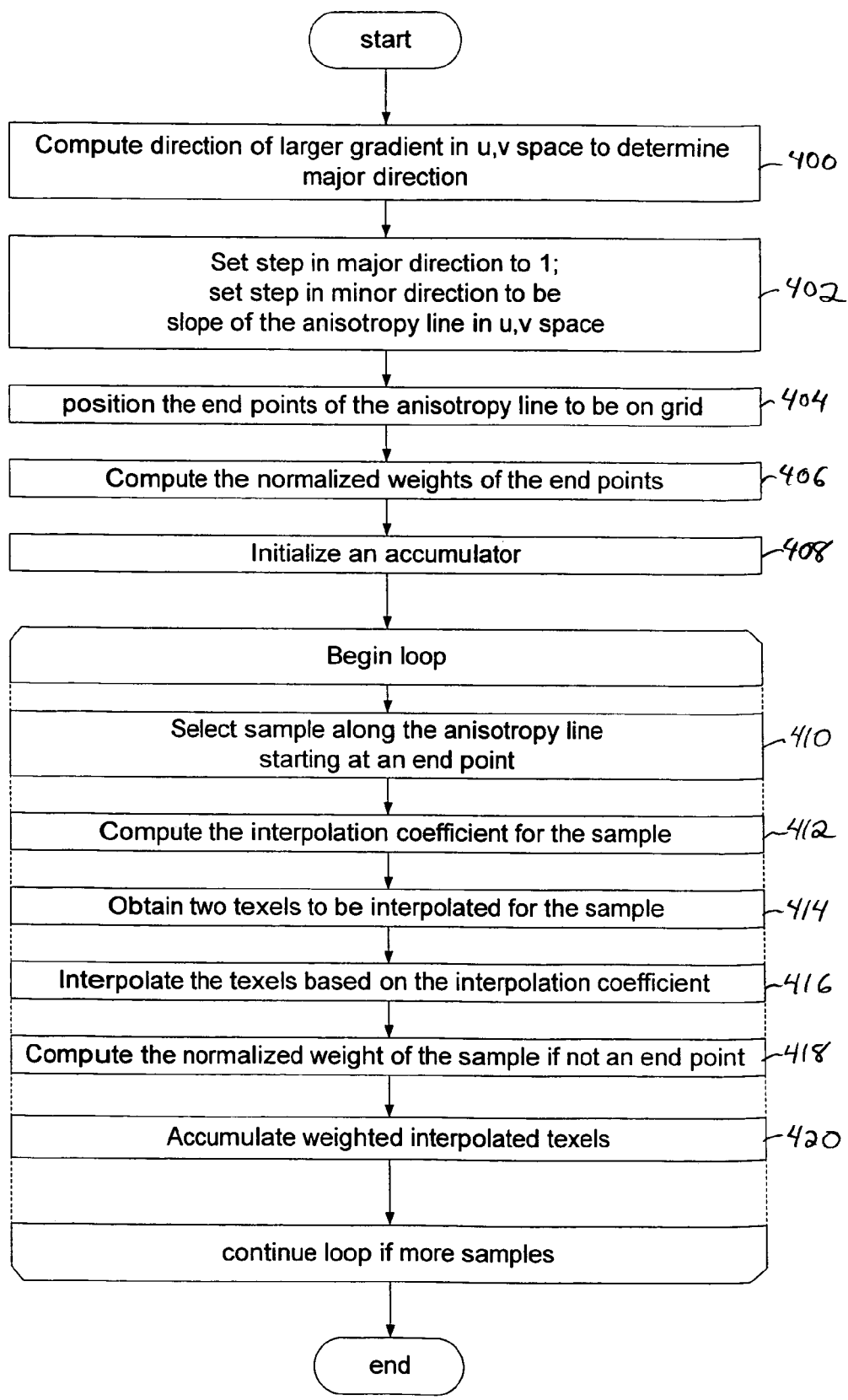
FIGS. 3A–3G show a flow chart of an algorithm in accordance with an embodiment of the present invention.

FIGS. 3A–3G show a flow chart in accordance with embodiment of the present invention. In FIG. 3A, steps 400–408 in preparation of a loop on the samples precede the loop. In step 400, the direction of the larger gradient in u,v space is determined and this is designated the major direction. The step in the major direction is set, in step 402, to unity and the step in the minor direction is set to the slope of the anisotropy line in the u,v space. In step 404, the end points of the anistropy line are positioned to be on grid in the texture space and, in step 406, the normalized weights of the end points are found. In step 408, an accumulator for storing the final texture value is initialized.

In the loop, step 410 selects the sample along the anistropy line starting at one of the end points. Next, in step 412, the interpolation coefficient for the sample is computed. In step 414, the two texels to be interpolated for the sample are obtained and, in step 416, they are interpolated using the interpolation coefficient. Next, in step 418, if the sample is not an end point, the normalized weight for the sample is found and, in step 420, the weighted interpolated texels are accumulated. The loop continues until there are no more samples to consider. When the loop ends, the accumulator contains the final value of the texture for the pixel in question.

Figure 3B:
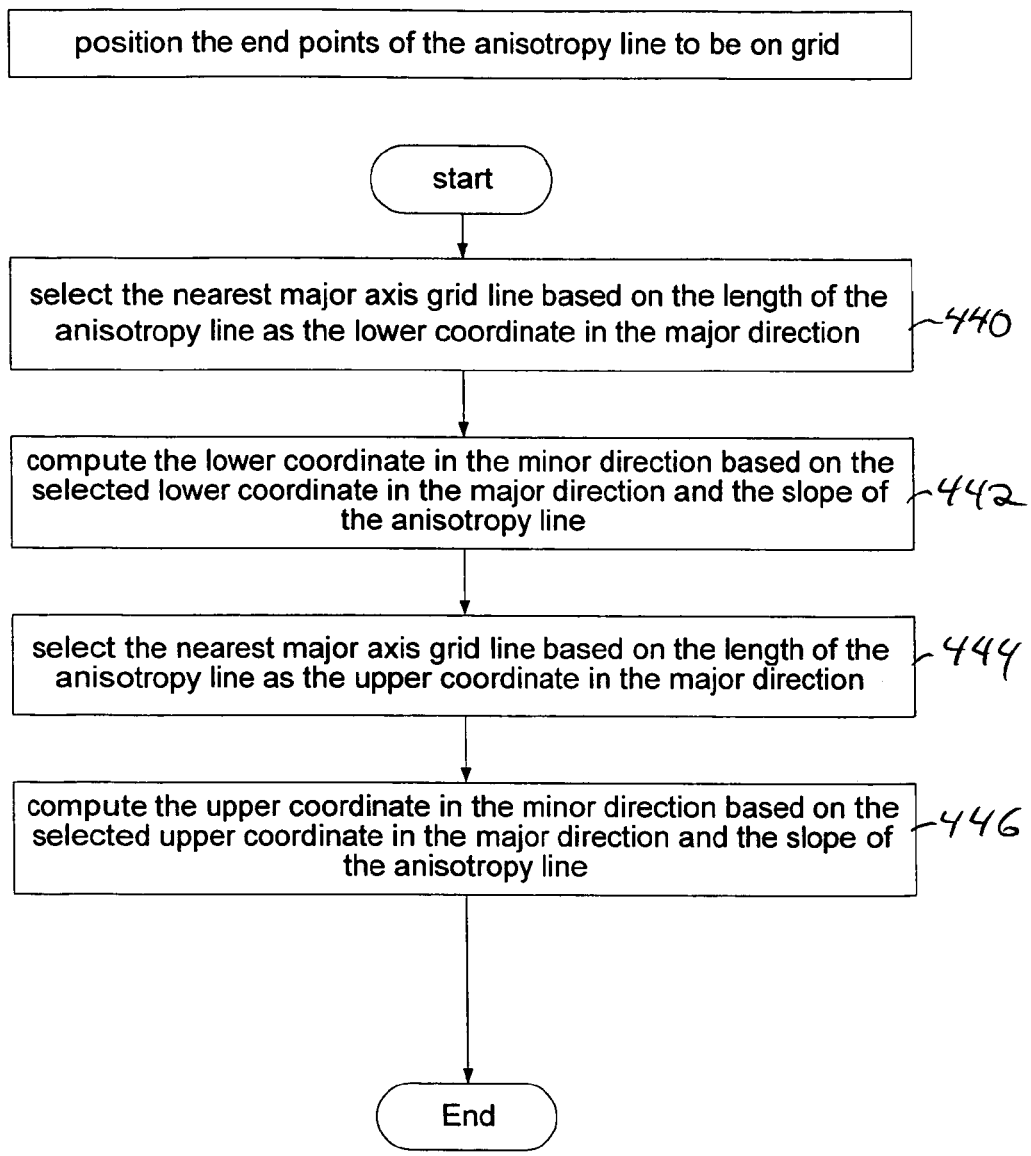

FIG. 3B shows the steps, in one embodiment, for calculating the end points of the anistropy line. In step 440, the nearest major axis grid line based on the length of the anisotropy line is selected as the lower coordinate in the major direction. In step 442, the lower coordinate in the minor direction is computed based on the selected lower coordinate in the major direction and the slope of the anistropy line. In step 444, the nearest major axis grid line based on the length of the anistropy line is selected as the upper coordinate in the major direction. In step 446, the upper coordinate in the minor direction is computed based on the selected upper coordinate in the major direction and the slope of the anistropy line.

Figure 3C:
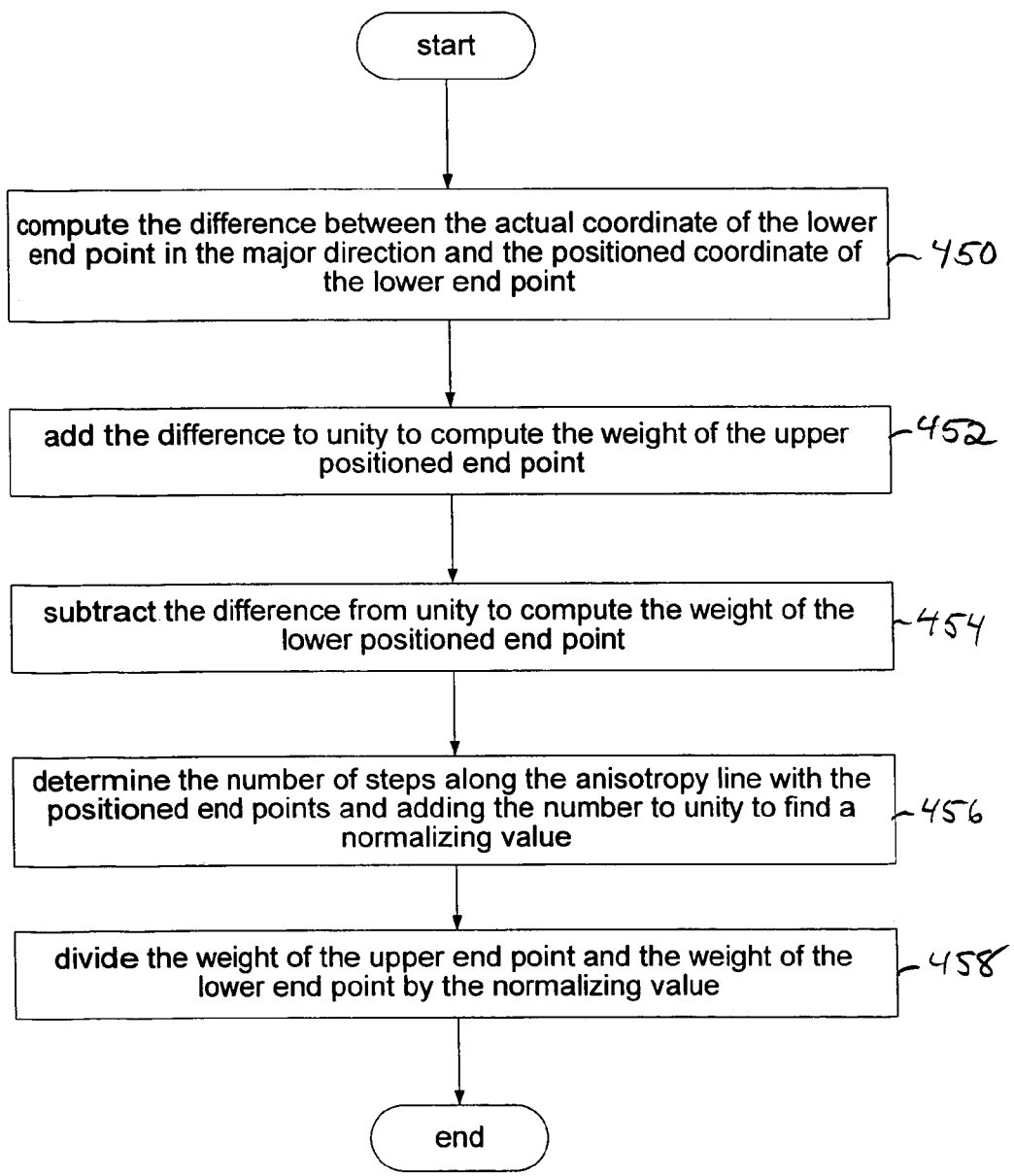

FIG. 3C shows the steps, in one embodiment, for calculating the normalized weights of the end points. First, the difference between the actual coordinate of the lower end point in the major direction and the positioned coordinate of the lower end point is computed, in step 450. Then in step 452, the difference is added to unity to compute the weight of the upper positioned end point. In step 454, the difference is subtraced from unity to compute the weight of the lower positioned end point. In step 456, the number of steps along the anistropy line with the positioned end points is determined and the number is added to unity to obtain the normalizing value. In step 458, the weight of the upper end point and the weight of the lower end point are each divididied by the normalizing value.

Figure 3D:
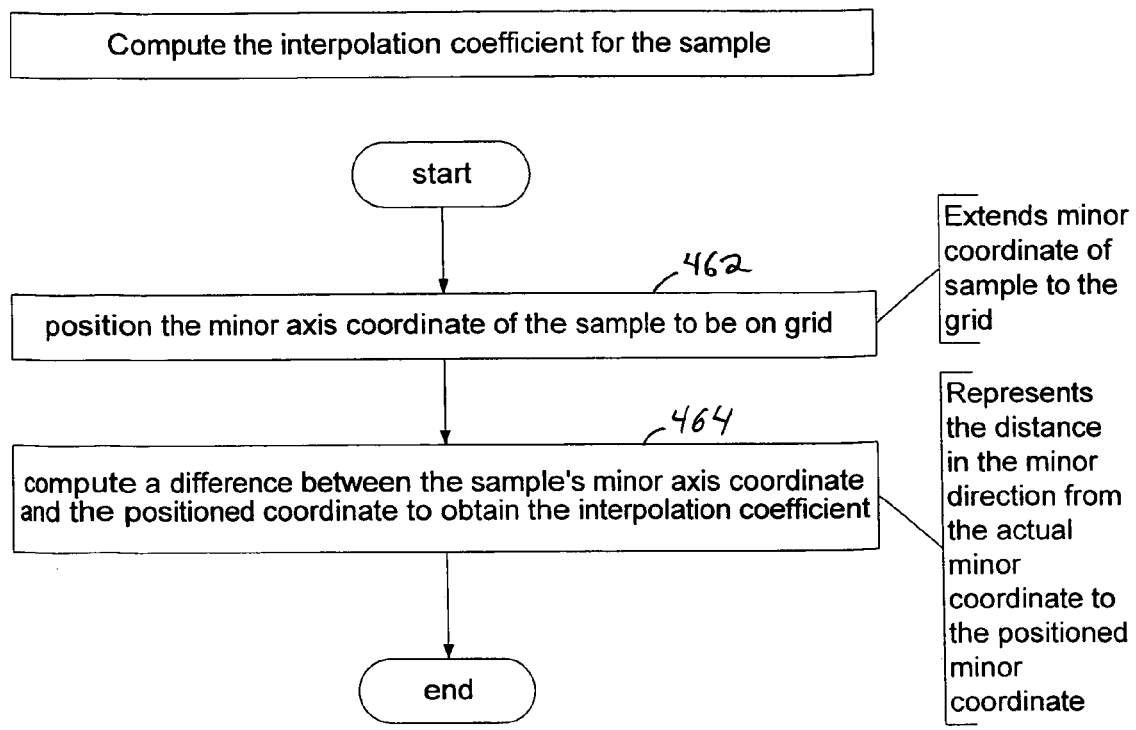

FIG. 3D shows the steps, in one embodiment, for computing the interpolation cooefficient for the sample. First in step 462, the minor axis coordinate of the sample is positioned to be on grid and in step 464, the difference between the sample's minor axis coordinate and the positioned coordinate computed to obtain the interpolation cooefficient.

Figure 3E:
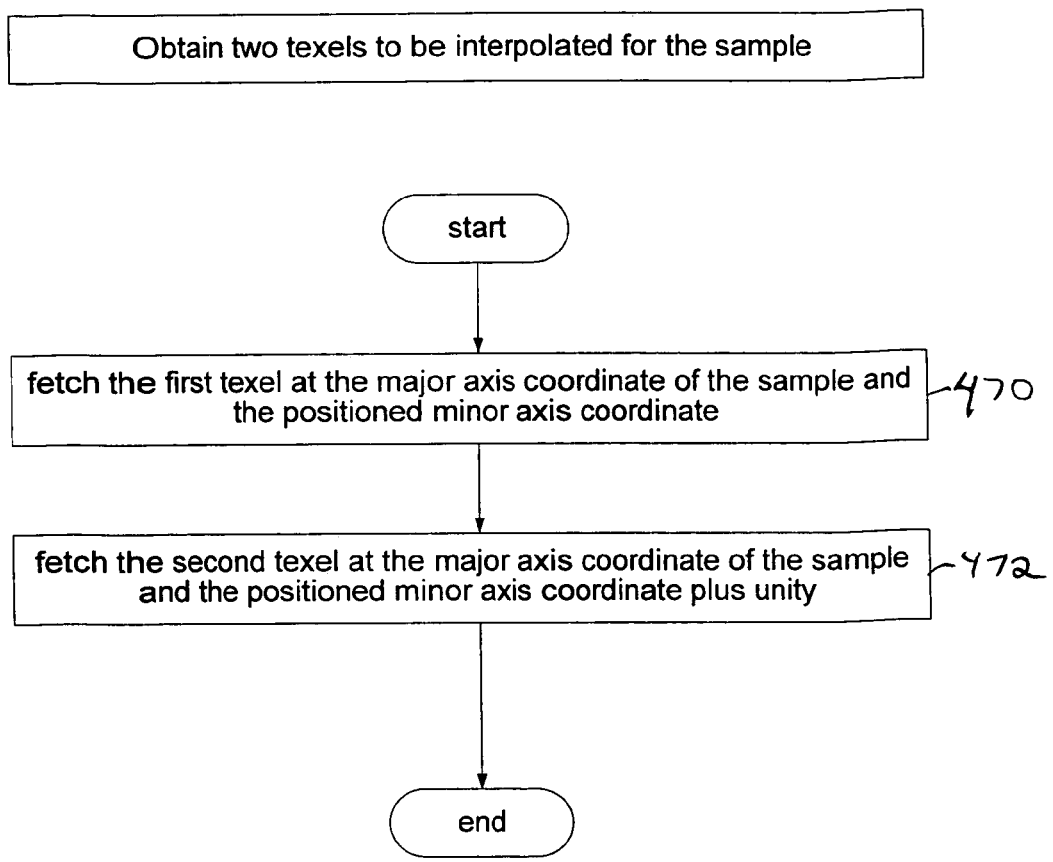

FIG. 3E shows the steps, in one embodiment, for obtaining the two texels to be interpolated for the sample. In step 470, the first texel is fetched using the major axis coordinate and the positioned minor axis coordinate of the sample. In step 472, the second texel is fetched using the major axis coordinate and the positioned minor axis coordinate +1.

Figure 3F:
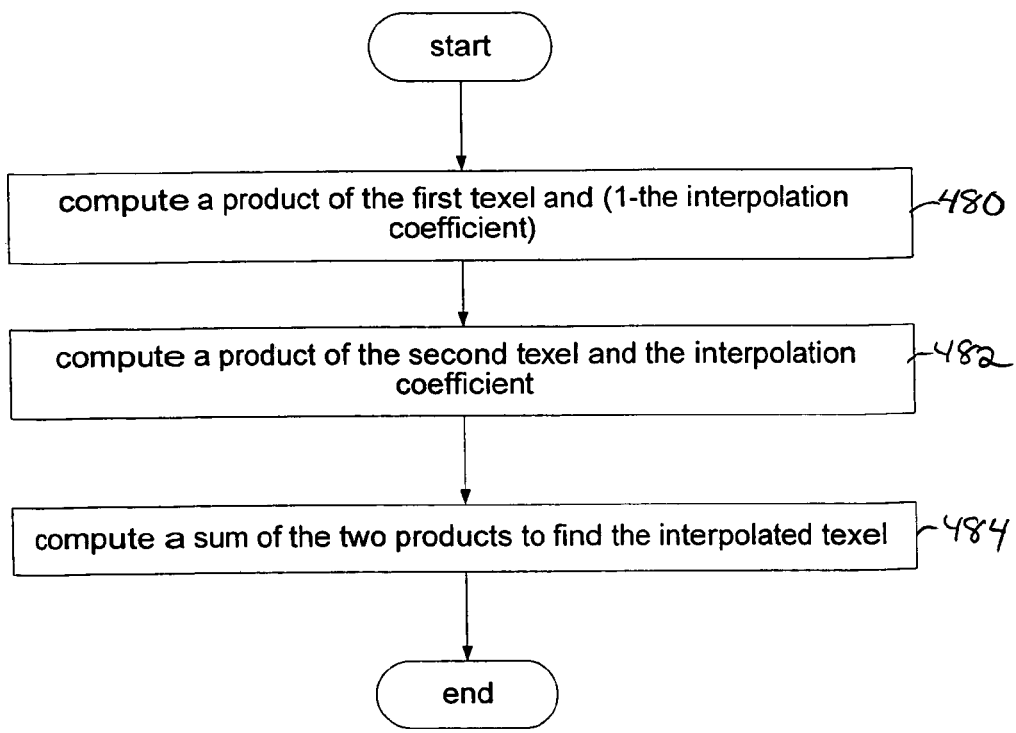

FIG. 3F shows the steps, in one embodiment, for interpolating the texels based on the interpolation coefficient. In step 480, the product of the first texel and (1–the interpolation cooefficient) is formed and, in step 482, the product of the second texel and the interpolation cooefficient is formed. In step 484, the sum of the two products is computed to find the interpolated texel.

Figure 3G:
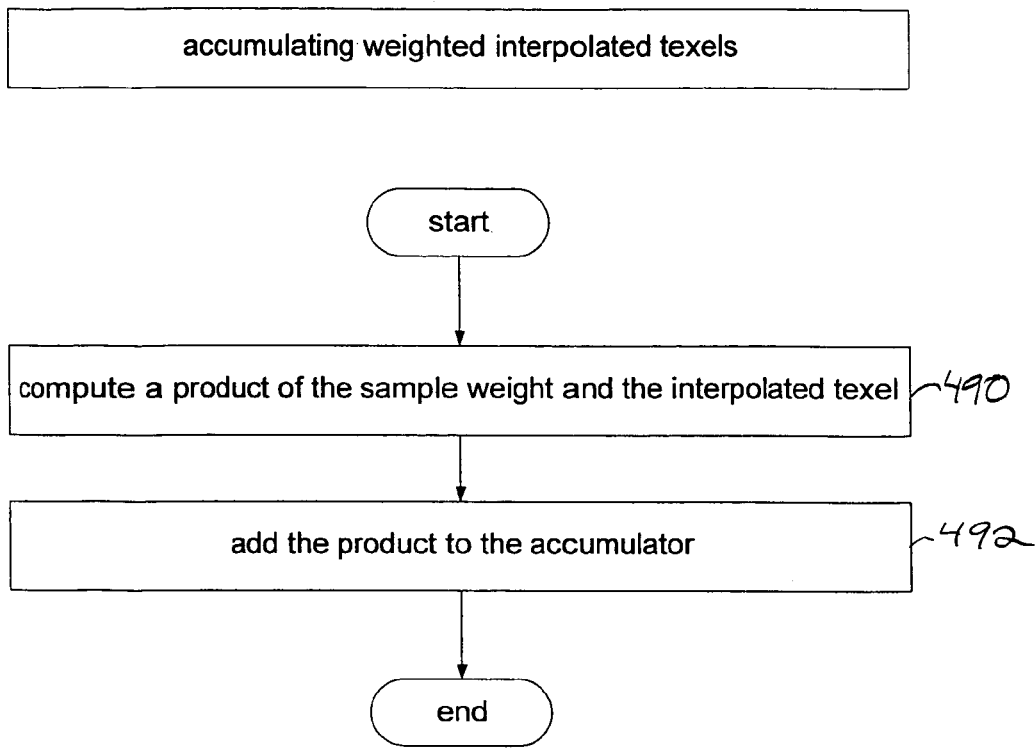

FIG. 3G shows the steps, in one embodiment, for accumulating weighted interpolated texels. In step 490, the product of the sample weight and the interpolated texel is formed and in step 492, the product is added to the contents of the accumulator.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of rendering a pixel with texture values, the method comprising:
   establishing sample points of a footprint of a pixel in a planar texture space, the texture space having a grid derived from discrete points on a first axis and a second axis orthogonal to the first axis, the first axis being the axis along which a change in texture is greater than that along the second axis;
   linearly interpolating two texel values at each sample point on the first axis, the texel values derived from a pair of adjacent grid points on the second axis, by weighting a sum of the two texel values based on the position of the sample point between the adjacent grid points of the second axis;
   assigning a weight to each of the interpolated texel values and accumulating the weighted texel values to arrive at a final texture value for the pixel; and
   rendering the pixel with the final texture value.

2. A method of rendering a pixel with texture values, as recited in claim 1, wherein, in the interpolated texel, a texel value having a sample point closer to a grid point of the second axis is given more weight than a texel value having a sample point farther from a grid point.

3. A method of rendering a pixel with texture values, as recited in claim 1,
   wherein establishing sample points of a footprint includes extending the footprint so that ends of the footprint are on the grid of the first axis; and
   wherein the weight of an interpolated pixel is adjusted to account for the extended footprint.

4. A method of rendering a pixel with texture values, as recited in claim 1, wherein an end of the footprint closer to a grid point on the first axis is given more weight than an end farther from a grid point.

5. A method of rendering a pixel with texture values, the method comprising:
   mapping a pixel to be displayed to a texture space to form a footprint of the pixel in said space, the footprint defining an anisotropy line having a pair of actual end points;
   determining a major direction and a minor direction of the footprint in said space, the major and minor direction being axes in said texture space;

setting a step size in the major direction to unity and a step size in the minor direction to the slope of the anisotropy line;

positioning the actual end points of the anisotropy line to be on grid in said texture space, wherein the step size defines a number of samples including the positioned end points along the anisotropy line, each sample to be assigned a weight;

computing a normalized weight for each of the positioned end points;

for each of the samples, including the positioned end points, on the anisotropy line in the texture space, computing an interpolation coefficient, obtaining first and second texel values to be interpolated, linearly interpolating the first and second texel values to create an interpolated texel value, computing a normalized weight of the sample if the sample is not one of the positioned end points, and accumulating weighted interpolated texels; and rendering the pixel with the accumulated texture value.

6. A method of rendering a pixel with texture values as recited in claim 5, wherein each end point has an upper and lower coordinates in the major and minor directions; and wherein positioning the actual end points includes:
computing the lower coordinates in the major and minor directions; and
computing the upper coordinates in the major and minor directions.

7. A method of rendering a pixel with texture values as recited in claim 6, wherein computing the lower coordinates in the major and minor directions includes:

selecting the nearest major axis grid line based on the length of the anisotropy line as the lower coordinate in the major direction; and computing the lower coordinate in the minor direction based on the selected lower coordinate in the major direction and the slope of the anisotropy line.

8. A method of rendering a pixel with texture values as recited in claim 7, wherein the pixel to be rendered has center coordinates on the anisotropy line; and wherein selecting the nearest major axis grid line based on the length of the anisotropy line as the lower coordinate in the major direction includes:
computing the difference between the center coordinate in the major direction and length of the anisotropy line; and
computing the floor of the difference.

9. A method of rendering a pixel with texture values as recited in claim 6, wherein computing the upper coordinates in the major and minor directions includes:

selecting the nearest major axis grid line based on the length of the anisotropy line as the upper coordinate in the major direction; and computing the upper coordinate in the minor direction based on the selected upper coordinate in the major direction and the slope of the anisotropy line.

10. A method of rendering a pixel with texture values as recited in claim 9, wherein the pixel to be rendered has center coordinates on the anisotropy line; and wherein selecting the nearest major axis grid line based on the length of the anisotropy line as the upper coordinate in the major direction includes:
computing the sum of the center coordinate in the major direction and length of the anisotropy line; and
computing the ceiling of the sum.

11. A method of rendering a pixel with texture values as recited in claim 5, wherein computing the normalized weights of the positioned end points includes:

computing the difference between the actual coordinate of the lower end point in the major direction and the positioned coordinate of the lower end point;

adding the difference to unity to compute the weight of the upper positioned end point;

subtracting the difference from unity to compute the weight of the lower positioned end point;

determining the number of steps along the anisotropy line with the positioned end points and adding the number to unity to find a normalizing value; and dividing the weight of the upper end point and the weight of the lower end point by the normalizing value.

12. A method of rendering a pixel with texture values as recited in claim 5, wherein computing an interpolation coefficient includes:

positioning the minor axis coordinate of the sample to be on grid; and computing a difference between the sample's minor axis coordinate and the positioned coordinate to obtain the interpolation coefficient.

13. A method of rendering a pixel with texture values as recited in claim 12, wherein obtaining first and second texel values to be interpolated includes:

fetching the first texel at the major axis coordinate of the sample and the positioned minor axis coordinate; and fetching the second texel at the major axis coordinate of the sample and the positioned minor axis coordinate plus unity.

14. A method of rendering a pixel with texture values as recited in claim 13, wherein linearly interpolating the first and second texel values to create an interpolated texel value includes:

computing a product of the first texel and (1−the interpolation coefficient);

computing a product of the second texel and the interpolation coefficient; and computing a sum of the two products to find the interpolated texel.

15. A method of rendering a pixel with texture values as recited in claim 14, wherein accumulating weighted interpolated texels includes:

computing a product of the sample weight and the interpolated texel; and adding the product to the accumulator.

* * * * *